US012764087B2

(12) United States Patent
Stadermann

(10) Patent No.: US 12,764,087 B2
(45) **Date of Patent: *Oct. 13, 2026**

(54) SYSTEM AND METHOD FOR ELECTRONIC CHAT PRODUCTION

(71) Applicant: Open Text Inc., Menlo Park, CA (US)

(72) Inventor: Jan Stadermann, Rheinbach (DE)

(73) Assignee: Open Text Inc., Menlo Park, CA (US)

( * ) Notice: Subject to any disclaimer, the term of this patent is extended or adjusted under 35 U.S.C. 154(b) by 53 days.

This patent is subject to a terminal disclaimer.

(21) Appl. No.: 18/921,997

(22) Filed: Oct. 21, 2024

(65) Prior Publication Data

US 2025/0055824 A1 Feb. 13, 2025

Related U.S. Application Data

(63) Continuation of application No. 18/162,478, filed on Jan. 31, 2023, now Pat. No. 12,177,178, which is a continuation of application No. 17/389,187, filed on Jul. 29, 2021, now Pat. No. 11,595,337.

(60) Provisional application No. 63/220,391, filed on Jul. 9, 2021.

(51) Int. Cl.
*H04L 51/216* (2022.01)

(52) U.S. Cl.
CPC .................................. *H04L 51/216* (2022.05)

(58) Field of Classification Search
None
See application file for complete search history.

(56) References Cited

U.S. PATENT DOCUMENTS

| | | | | |
|---|---|---|---|---|
| 10,586,266 | B2 | 3/2020 | Fredrich | |
| 11,631,056 | B2 | 4/2023 | Carter et al. | |
| 12,314,658 | B2 | 5/2025 | Stadermann | |
| 12,341,741 | B2 | 6/2025 | Stadermann | |
| 2016/0019659 | A1* | 1/2016 | Doganata | G06Q 30/0202 705/319 |
| 2016/0286667 | A1 | 9/2016 | Fuessl | |
| 2019/0251166 | A1* | 8/2019 | Penrose | G06F 16/3329 |
| 2020/0311151 | A1* | 10/2020 | Menon | H04L 51/56 |

(Continued)

OTHER PUBLICATIONS

Notice of Allowance issued for U.S. Appl. No. 17/389,194, mailed Jan. 23, 2025, 10 pages.

(Continued)

*Primary Examiner* — June Sison
(74) *Attorney, Agent, or Firm* — Sprinkle IP Law Group

(57) ABSTRACT

Systems, methods, and computer program products for adaptively splitting electronic chats are provided. An e-discovery system comprises a computer processor and a non-transitory, computer-readable medium embodying thereon a set of computer instructions executable by the computer processor. The set of computer instructions includes instructions for: sending a chat query to a remote electronic chat service; receiving an electronic chat responsive to the chat query, the electronic chat embodying a set of electronic chat messages; adaptively splitting the set of electronic chat messages into a set of conversations, each conversation in the set of conversations comprising a subset of electronic chat messages from the set of electronic chat messages; and storing each conversation from the set of conversations as a separate document.

20 Claims, 9 Drawing Sheets

(56) References Cited

U.S. PATENT DOCUMENTS

| | | | | |
|---|---|---|---|---|
| 2021/0006515 | A1* | 1/2021 | Downs | G06F 40/186 |
| 2021/0029065 | A1* | 1/2021 | Erhart | H04L 51/02 |
| 2021/0335367 | A1* | 10/2021 | Graff | G06F 9/547 |
| 2025/0252255 | A1 | 8/2025 | Stadermann | |
| 2025/0286850 | A1 | 9/2025 | Stadermann | |

OTHER PUBLICATIONS

Notice of Allowance issued for U.S. Appl. No. 18/317,839, mailed Feb. 26, 2025, 8 pages.

* cited by examiner

630

640

June 15, 2021 632

637 639

635

09:18:25 Scott: Hi Steve. Can you please review our legal language and edit as needed? I just sent you an email with our current language.

10:05:15 Steven: Sure, I reviewed what you have now and responded with a few updates to the language. Let me know if you have any questions.

10:06:30 Scott: Thank you, I got it!

650

June 17, 2021

651

12:55:00 Steven: Hi Scott, I've got some questions regarding our trademark, are you available to jump on a call? The questions relate to the goods and services we sell under our trademark name.

13:20:01 Scott: I am, I accepted your meeting invite…talk to you in a bit.

660

13:35:05 Steven: Excellent! While I have your attention, is this a good time to review the product for potentially patentable subject matter?

13:46:51 Scott: Yes. We have a few new web authoring features we can go over. Some of the new features have never been offered on the market and definitely give us a leg up over the competition.

13:48:09 Steven: Sounds good, I'll setup a separate meeting and add our outside patent counsel to the call.

FIG. 6

SYSTEM AND METHOD FOR ELECTRONIC CHAT PRODUCTION

RELATED APPLICATIONS

This application is a continuation of and claims a benefit of priority under 35 U.S.C. 120 from U.S. patent application Ser. No. 18/162,478, filed Jan. 31, 2023, issued as U.S. Pat. No. 12,177,178, entitled "System and Method for Electronic Chat Production," which is a continuation of and claims a benefit of priority under 35 U.S.C. 120 from, U.S. patent application Ser. No. 17/389,187, filed Jul. 29, 2021, issued as U.S. Pat. No. 11,595,337, entitled "System and Method for Electronic Chat Production," which claims the benefit of priority under 35 U.S.C. § 119 (e) to U.S. Provisional Application No. 63/220,391, entitled "System and Method for Electronic Chat Production," filed Jul. 9, 2021, all of which are hereby fully incorporated herein by reference for all purposes.

TECHNICAL FIELD

This disclosure relates generally to processing of electronic chat data. More particularly, this disclosure relates to methods and systems for processing electronic chat data for electronic discovery. Even more particularly, this disclosure relates to adaptively splitting electronic chats.

BACKGROUND

Many online collaboration platforms offer electronic chat services to allow collaborators to quickly exchange usually short messages. As organizations increasingly use the electronic chat functionality provided by the collaboration platforms, a growing volume of information that is potentially subject to legal production is contained in electronic chats. In many cases, an organization does not own or control the database that contains its electronic chat data. Instead, the database is owned and controlled by a third-party service provider, such as an online collaboration platform provider, leaving the organization limited ways to retrieve the electronic chat data.

Electronic discovery (e-Discovery) generally refers to the collection, processing, analysis, classification, review, and production of electronically stored information (ESI) in legal proceedings. E-discovery tools use a document paradigm for ESI. While determining document boundaries for many forms of electronic data, such as files, is relatively straightforward, some forms of ESI, such as electronic chat data, do not lend themselves well to the document paradigm.

In a typical e-discovery scenario, an organization subject to discovery will provide criteria to the electronic chat service and the electronic chat service provider will return the electronic chat meeting the criteria. The current solution is to treat each electronic chat as a document for purposes of e-discovery, even though an electronic chat may include a great number of messages on a wide variety of topics over a long period of time. For example, the e-discovery tool stores the entire electronic chat as a single document—for example, an XML document—and then indexes that document as a whole for searching.

Treating an electronic chat as a document in e-discovery presents challenges for the subsequent processing and analysis of the electronic chat. During e-discovery, the parties often agree on a set of keywords to be used to search for relevant documents. Because an electronic chat as a whole is treated as a single document and indexed as such, a search for documents containing the keywords may locate the document embodying the entire electronic chat, even if only a few messages of the electronic chat contain the keyword. A reviewer reviewing the document prior to production for relevance, or to redact privileged information, confidential information or other information, or to classify the document, must then review the entire electronic chat document, which may span hundreds of pages, even though a large portion of the electronic chat may not be relevant to the reviewer's task or, in some cases, the legal proceeding at all. Consequently, legal review of electronic chats is inefficient and error prone.

Not only does treating an entire electronic chat as a document have potential negative effects for manual production review, but it can also negatively impact downstream machine learning or artificial intelligence-based processing of electronic chat documents. It is becoming increasingly common in e-discovery to use machine learning based classifiers to classify documents for subsequent processing based on the content of the documents. A document embodying an electronic chat may be classified as relevant to a particular topic even if only a small number of messages are actually relevant to that topic. If an electronic chat covers multiple subjects, the machine learning classifier may classify the electronic chat document according to a potentially large number of topics. Once classified, however, the entire document will be treated according to the assigned topic in subsequent processing and review stages, leading to the unnecessary processing and review of content not actually relevant to the topic. This inefficiency may be compounded if the topic-based processing and review is performed separately for each topic.

As such, there is a need to improve computer-based technologies, such as e-discovery tools, that collect electronic chat data.

SUMMARY

Attention is thus directed to systems, methods, and computer program products for adaptively splitting electronic chats. One embodiment of a computer-implemented method comprises a computer processor receiving an electronic chat—for example, an electronic chat meeting a chat query criterion—the electronic chat embodying a set of electronic chat messages. The method can further include the computer processor adaptively splitting the set of electronic chat messages from the electronic chat into a set of conversations, each conversation in the set of conversations comprising a subset of electronic chat messages from the set of electronic chat messages. Each conversation in the set of conversations can be stored, for example, as a separate document.

As will be appreciated, each electronic chat message embodied in the electronic chat has associated metadata. According to some embodiments, adaptively splitting the set of electronic chat messages into the set of conversations comprises clustering the set of electronic chat messages into clusters based on the associated metadata of the electronic chat messages from the set of electronic chat messages.

More particularly, each electronic chat message embodied in the electronic chat has a timestamp. In some embodiments, adaptively splitting the set of electronic chat messages into the set of conversations comprises clustering the set of electronic chat messages into clusters based on the timestamps of the electronic chat messages from the set of electronic chat messages.

In some embodiments, messages are adaptively split into the set of conversations based on the time gaps between adjacent messages in the electronic chat. One embodiment can comprise the computer processor determining a set of time gaps between adjacent messages from the set of electronic chat messages and determining a set of models that model the set of time gaps. According to one embodiment, determining the set of models comprises determining a single Gaussian distribution of the set of time gaps and learning, using the set of time gaps, a Gaussian mixture model representing a mixture of Gaussian distributions.

A best model can be determined from the set of models. According to one embodiment, selecting the model from the set of models comprises determining a Bayesian information criterion for each model in the set of models and selecting the best model from the set of models based on the Bayesian information criteria for the set of models.

In accordance with one embodiment, the electronic chat is not split into multiple conversations if the single Gaussian distribution is selected as the best model. On the other hand, adaptive splitting of the set of electronic chat messages into the set of conversations can be performed based on the Gaussian mixture model if the Gaussian mixture model is selected as the best model.

In one embodiment, performing the adaptive splitting of the set of electronic chat messages into the set of conversations based on the Gaussian mixture model comprises: selecting a time gap from the set of time gaps and determining a probability of the selected time gap for each Gaussian distribution in the mixture of Gaussian distributions to produce a set of probabilities for the selected time gap. Based on a determination that a highest probability from the set of probabilities for the selected time gap is for the highest mean value Gaussian distribution represented by the Gaussian mixture model, the electronic chat can be split into a new conversation at the selected time gap. In accordance with one embodiment, the electronic chat is not split at the selected time gap if the highest probability from the set of probabilities for the selected time gap is not for the highest mean value Gaussian distribution represented by the Gaussian mixture model.

One embodiment includes receiving, by an electronic discovery system executing on a computer processor, an electronic chat comprising a set of electronic chat messages, each of the electronic chat messages having a timestamp, determining a set of time gaps between the chat messages, determining a set of models that model the set of time gaps and selecting an optimum model from the set of models. According to one embodiment, the electronic chat received is based on a chat query criterion.

Determining the set of models can comprise determining a single Gaussian distribution of the set of time gaps and determining, using the set of time gaps, a Gaussian mixture model representing a mixture of Gaussian distributions. Based on selecting the single Gaussian distribution as the optimum model, it can be determined that the electronic chat comprises a single electronic chat message. Based on selecting the Gaussian mixture model as the optimum model, an adaptive splitting of the set of electronic chat messages into a set of conversations can be performed based on the Gaussian mixture model.

According to one embodiment, determining a Gaussian mixture model representing a mixture of Gaussian distributions comprises learning the Gaussian mixture model by modeling the mixture of Gaussian distributions. Further, according to one embodiment, determining the Gaussian mixture model includes setting a maximum number of Gaussian components and modeling a set of Gaussian distributions from 2 through the maximum number of Gaussian components. Learning the Gaussian mixture model may comprise using an expectation maximization technique to learn the Gaussian distributions of the Gaussian mixture model.

According to one embodiment, selecting an optimum model from the set of models further comprises determining a Bayesian information criterion for each model in the set of models and selecting the optimal model from the set of models based on the Bayesian information criteria for the set of models.

One embodiment may include the electronic discovery system determining a highest mean value distribution from the mixture of Gaussian distributions of the Gaussian mixture model. Adaptively splitting of the set of electronic chat messages into the set of conversations based on the Gaussian mixture model may include selecting a time gap from the set of time gaps, determining a probability of the selected time gap for each Gaussian distribution in the mixture of Gaussian distributions to produce a set of probabilities for the selected time gap, and based on a determination that a highest probability from the set of probabilities for the selected time gap is for the highest mean value distribution, splitting the electronic chat based on the selected time gap to produce the set of conversations.

Another embodiment may include receiving, by an electronic discovery system executing on a computer processor, an electronic chat comprising a set of electronic chat messages, each of the electronic chat messages having a timestamp, determining a set of time gaps between the chat messages, determining a set of models that model the set of time gaps, and selecting an optimum model from the set of models. Determining the set of models may include determining, using the set of time gaps, a Gaussian mixture model representing a mixture of Gaussian distributions. Embodiments may further include performing an adaptive splitting of the set of electronic chat messages based on selecting the Gaussian mixture model as the optimum model and text analysis of the electronic chat. The adaptive splitting may include splitting the set of electronic chat message into a set of conversations based on the Gaussian mixture model, performing text analysis on the set of conversations based on identified one or more chat subject matter and splitting the set of conversations based on identified one or more chat subject matter.

According to one embodiment, the chat subject matter is a set of chat subject matter within a parent chat subject matter grouping. Further, according to one embodiment, receiving the electronic chat comprising a set of electronic chat messages is based on a chat query criterion identifying the parent chat subject matter grouping.

According to one embodiment, the chat subject matter is a plurality of chat subject matter. One embodiment may include, applying, by a text mining and classification engine, a text analysis on the electronic chat to derive the plurality of chat subject matters for the electronic chat. Further, one embodiment may include splitting the set of conversations by identifying corresponding chat messages characterized by one of the chat subject matters.

Embodiments improve on computer-implemented technologies, such as e-discovery systems, that collect and process chat data. Adaptively splitting a chat into multiple conversations increases the precision of downstream processes, such as search indexing and machine-learning based classification and increases processing efficiency by reducing the downstream processing of content not related to a particular search or classification.

Embodiments further provide a mechanism to split messages into conversations that do not require content analysis. Mechanisms described herein allow adaptive splitting to be implemented without requiring the overhead of content analysis as some embodiments do not require analyzing the content of the chat messages. Further, adaptive splitting can be implemented based on unsupervised learning from the chat being analyzed and does not require a large historical training data set of messages for training. In some embodiments, a hierarchy of processing may be used in which adaptive splitting according to mechanisms described herein is used to split chats into conversations, and the conversations are used to train content-based predictive models or are classified by content-based predictive models.

BRIEF DESCRIPTION OF THE DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features and wherein:

FIG. 6 is a flow chart illustrating one embodiment of electronic chat splitting into separate conversations based on time gap analysis and text analysis of an electronic chat;

DETAILED DESCRIPTION

Embodiments and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the embodiments in detail. It should be understood, however, that the detailed description and the specific examples are given by way of illustration only and not by way of limitation. Various substitutions, modifications, additions and/or rearrangements within the spirit and/or scope of the underlying inventive concept will become apparent to those skilled in the art from this disclosure.

Figure 1:
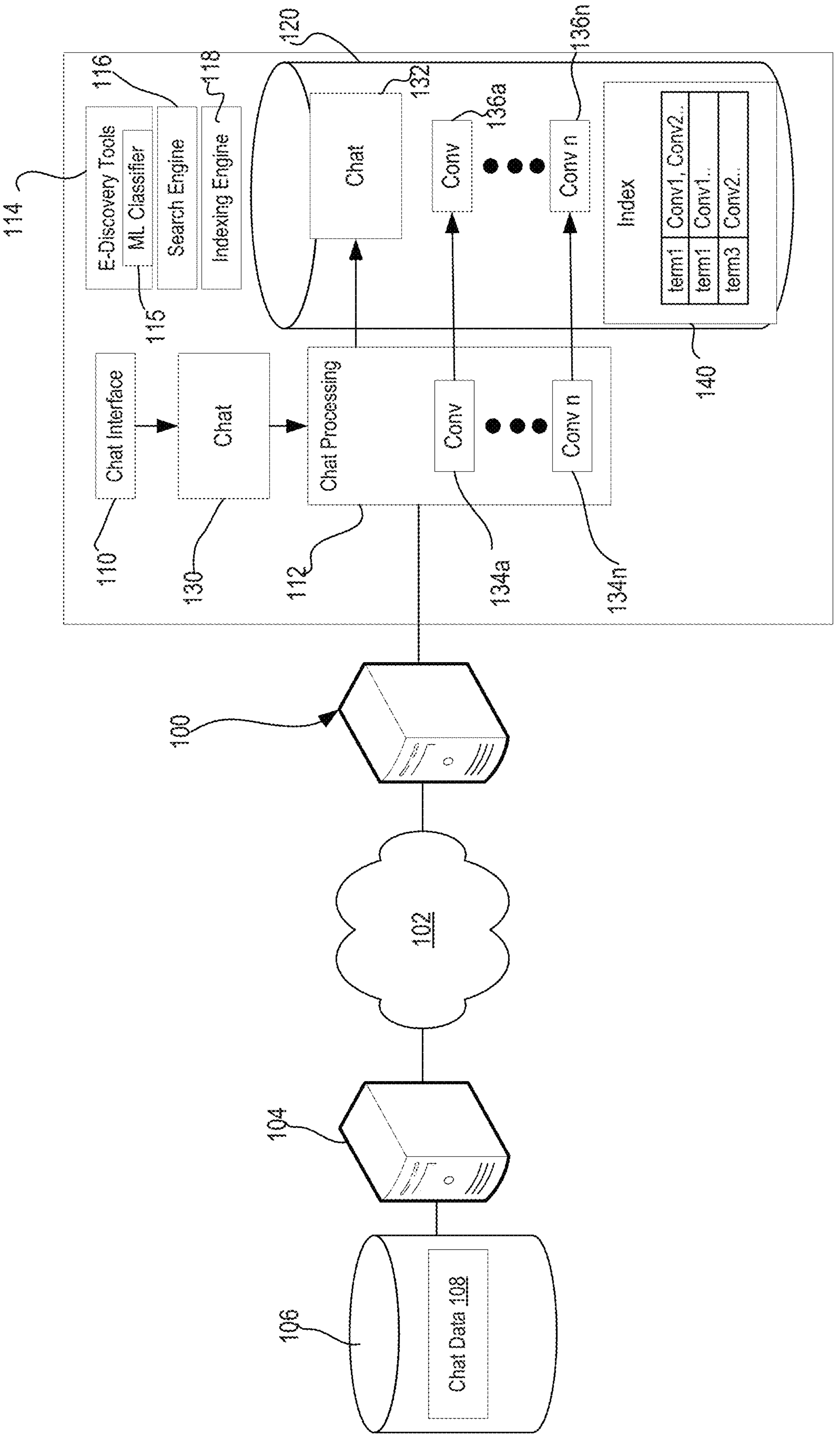
FIG. 1 is a diagrammatic representation of one embodiment of computing ecosystem comprising an e-discovery computer system connected to an electronic chat system.

FIG. 1 is a diagrammatic representation of a computing ecosystem comprising an e-discovery computer system 100 connected by a network 102 to an electronic chat system 104, such as an online collaboration platform or other computer system that provides an electronic chat service. Electronic chat system 104, according to one embodiment, is a cloud-based or other online collaboration platform that provides an electronic chat service. Electronic chat system 104 comprises a database 106 of electronic chat data 108. In some embodiments, electronic chat system 104 is owned and operated independently from the organizations or other entities that utilize the electronic chat service. As such, a particular organization's EIS may include electronic chat data contained in database 106 of which that organization does not have control or to which the organization does not have direct access. Access to the organization's electronic chat data may be achieved through an application programming interface (API) or other interface or access mechanism that is pertinent to the electronic chat service.

E-discovery computer system 100 includes components that serve to retrieve electronic chat data from electronic chat system 104 and segregate electronic chats received from electronic chat system 104 into logical groupings of related messages (referred to herein as conversations) from the electronic chat for further processing. In the illustrated embodiment then, e-discovery computer system 100 includes electronic chat interface 110, such as an API or other interface, to interface with electronic chat system 104 and electronic chat splitter component 112 to segregate electronic chats into conversations. The conversations produced by electronic chat splitter component 112 can be leveraged by other tools. The conversations in a data store 120 may be indexed by an indexing engine 118 for searching via a search engine 116. E-discovery computer system 100 may further include a variety of e-discovery tools to review, redact, analyze, classify, or otherwise process documents or conversations.

In operation, a user of e-discovery computer system 100 may submit a query for electronic chat data meeting particular criteria, such as electronic chat data associated with a particular custodian or electronic chat data meeting date criteria. As will be appreciated, the particular electronic chat search data criteria supported may depend on the electronic chat system 104. In any case, electronic chat interface 110 can be utilized to send an electronic chat query for electronic chats meeting particular criteria to electronic chat system 104 and receive responsive electronic chats in return.

In general, electronic chat system 104 can return an electronic chat responsive to the electronic chat search criteria. Various mechanisms may be used to return an electronic chat. For example, electronic chat interface 110 may receive each electronic chat as a corresponding file or data stream. As a more particular example, each electronic chat may be received as a corresponding XML file or XML stream. In some cases, an electronic chat that meets the electronic chat search criteria will include all the messages in the electronic chat, even if the individual messages do not meet the electronic chat search criteria.

E-discovery computer system 100 may thus receive an electronic chat 130—by way of example, but not limitation, an XML file or XML stream—that includes any number of messages by any number of participants, over a potentially large period of time. In prior document-based e-discovery systems, electronic chat 130 is stored as a single electronic chat document 132 embodying all the messages from the electronic chat, which can then be indexed or otherwise processed as an individual document embodying the entire electronic chat. Embodiments described herein, however, include an electronic chat splitter component 112 that processes received electronic chats to determine n conversations embodied in a particular electronic chat and, if n is greater than one, segregates the conversations for further processing. For example, electronic chat splitter component 112 processes electronic chat 130 to extract conversations **134*a*-134*n***.

According to one embodiment, electronic chat splitter component 112 stores the n extracted conversations as separate files or other data structures for further processing. For example, electronic chat splitter component 112 stores conversations **134*a*-134*n* as separate conversation documents 136*a*-136*n* for further processing. As an even more particular example, electronic chat splitter component 112 stores each conversation 134*a*-134*n* extracted from electronic chat 130** as an individual file—for example, an XML file.

Downstream processes may thus process the conversations extracted from an electronic chat. For example, indexing engine 118, which may be a component of or separate from search engine 116, separately indexes the documents **136*a*-136*n* as individual documents such that the extracted conversations are individually represented in the index 140. As illustrated then, index 140 may for example associate terms with individual conversation documents 136*a*-136*n*—which may also be considered electronic chat documents—instead of, or in addition to, associating the terms with electronic chat document 132 as a whole. Consequently, when a user using an e-discovery tool 114 searches for documents including "term1", search engine 116 will return a reference to conversation document 136*a* (and any other documents containing the term according to index 140). While index 140 is illustrated as an inverse index, index 140 may comprise other types of indexes in addition to, or as alternative to, an inverse index. Further, the documents 136*a*-136*n* may be independently classifiable by machine learning classifiers (e.g., machine learning classifier 115**) utilized by the e-discovery tools.

Figure 2:
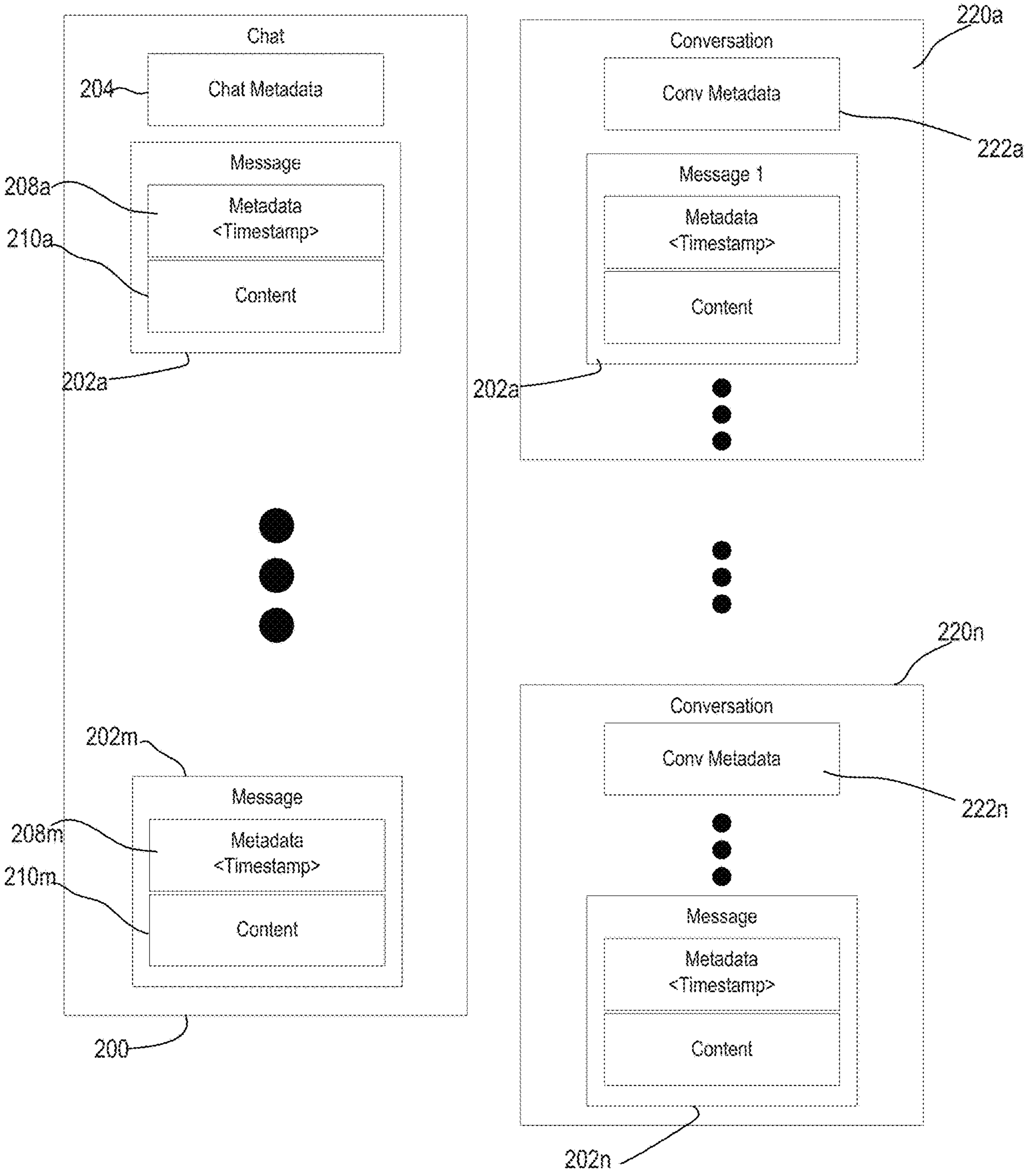
FIG. 2 is a diagrammatic representation of one embodiment of splitting an electronic chat.

Turning to FIG. 2, a diagrammatic representation of splitting an electronic chat 200 (for example, electronic chat 130) into n conversations is depicted, where n is one or more. Electronic chat 200 may be received, for example, as a file, a data stream or according to another format. As will be appreciated, an electronic chat is a logical container containing any number of messages (e.g., message **202*a*-message 202*m*), by any number of different participants, created over a period of time. Electronic chat 200 may include some electronic chat metadata 204 that is common to all the messages in the electronic chat. Electronic chat metadata 204 may include, for example, an electronic chat identifier that uniquely identifies the electronic chat from other electronic chats maintained by the electronic chat service. Each message may also include message metadata (e.g., message metadata 208*a* . . . message metadata 208*m*) and content (e.g., message content 210*a* . . . content 210*m***). The message metadata of a message may include, for example, a user identifier to identify the participant who sent the message, a message id that uniquely identifies the message from other messages in the electronic chat or other messages stored by the electronic chat service and a timestamp indicating, for example, when the message was created or sent. The message content contains the content of the message created by the participant.

An electronic chat splitter component (e.g., electronic chat splitter component 112) applies rules to determine a number n of conversations represented by the messages in electronic chat 200. In some embodiments, the electronic chat splitter may be configured with a minimum number of messages per conversation such that a split will not occur if a resulting conversation will have less than the configured number of messages. If n is greater than one, the electron chat splitter component segregates the messages based on conversation to create n conversations (e.g., conversation **220*a* . . . conversation 220*n*) from the electronic chat 200. If the electronic chat splitter component determines that the messages of electronic chat 200 represent a single conversation, electronic chat 200** can be stored as a single conversation. If the electronic chat splitter component determines that the messages of electronic chat represent multiple conversations, then the electronic chat splitter component splits the messages into the appropriate number of conversations.

According to one embodiment, each conversation includes conversation metadata (e.g., conversation metadata **222*a* . . . conversation metadata 222*n*) and messages from the electronic chat 200 from which the conversations were created. The conversation metadata may include, for example, an indication of the electronic chat 200 from which the conversation was created or other metadata that links the conversations created from a particular chat, the identity of the conversation to uniquely identify it from other conversations (e.g., other conversations created from the same electronic chat or other conversations in the system). In some embodiments, the conversation metadata may include all or a portion of the electronic chat metadata. For example, each conversation metadata 222*a* . . . conversation metadata 222*n* may include all or a portion of electronic chat metadata 204**.

According to one embodiment, if the messages of electronic chat 200 represent a single conversation, the electronic chat splitter component stores all the messages from that electronic chat as a single conversation. If the messages of electronic chat 200 represent multiple conversations, then each conversation created from electronic chat 200 will contain a respective subset of messages from the electronic chat 200 from which the conversation was created.

The electronic chat splitter component stores each conversation (e.g., conversation **220*a* . . . conversation 220*n*) created from electronic chat 200** as a separate logical entity. Even more particularly, in some embodiments, each conversation is stored as a separately indexable data structure. In a document-centric e-discovery system, each conversation may be stored as a separate document according to the storage paradigm of the e-discovery system. For example, each conversation may be stored as a separate file in some embodiments (e.g., an XML file or other file).

The electronic chat splitter component may use a number of mechanisms, based on any number of dimensions of metadata, to split an electronic chat into conversations. Examples include, but are not limited to, machine learning techniques such as k-means clustering, gaussian mixture models, or other unsupervised hard or soft clustering techniques or other machine learning models.

According to one embodiment, the electronic chat splitting component adaptively splits electronic chats into conversations based on the time gaps represented in the electronic chat. In accordance with one aspect of the present disclosure, the electronic chat splitter component applies a model that embodies the assumptions that the probability distribution for time gaps within a conversation is Gaussian and the range in values of time gaps between messages varies between conversations.

Figure 3A:
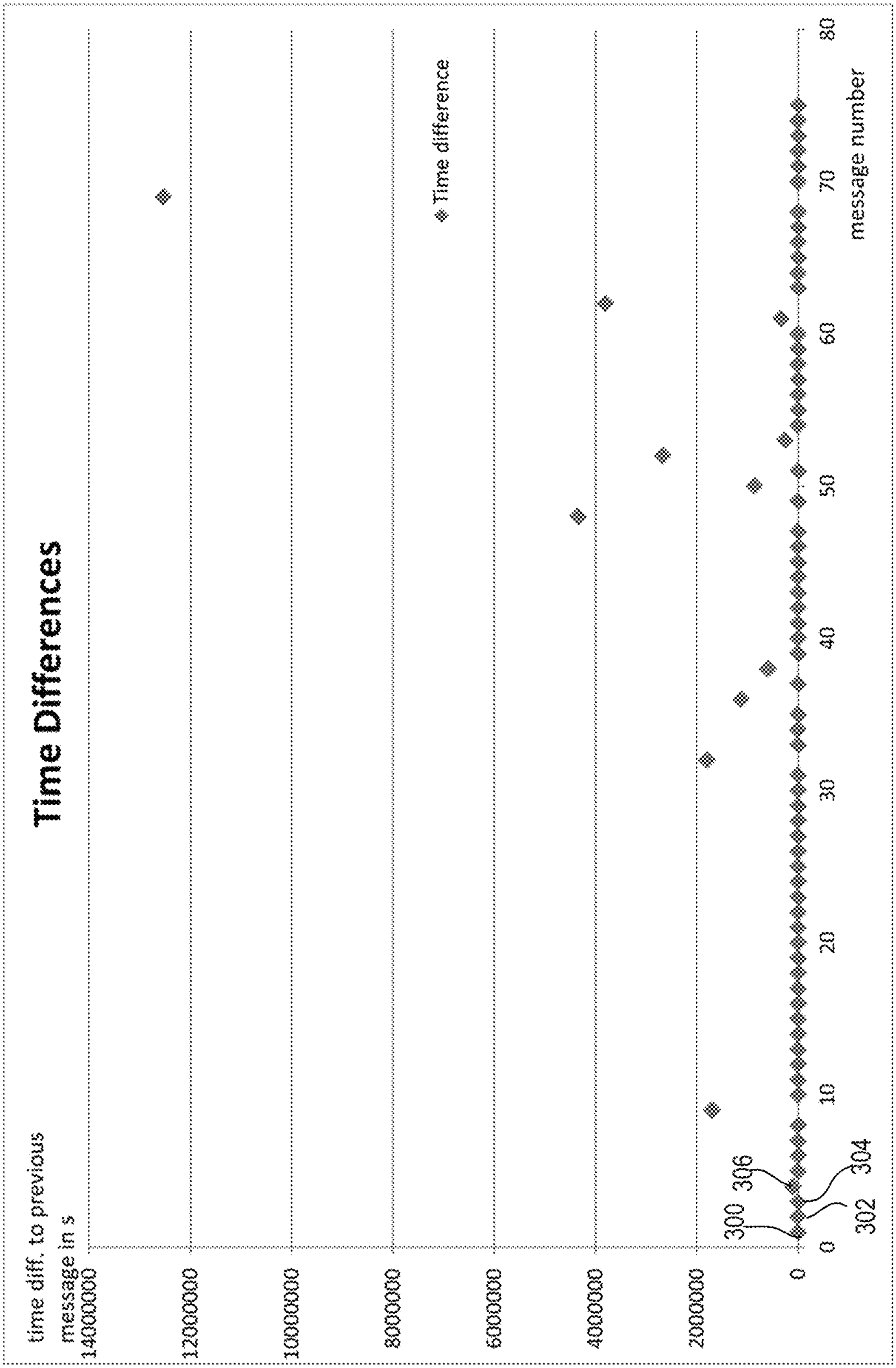
FIG. 3A illustrates an example set of time gap data.

The time gaps between messages can be determined from the timestamps of the messages (e.g., from the message metadata **208*a*-208*n*). Turning to FIG. 3A, a graph illustrating a set of example data for an electronic chat that contains seventy-five messages is provided. In this graph, datapoint ($x_i$) represents the time delay (y-axis) between when a message$_i$ and the prior message$_{(i-1)}$ from the electronic chat was received (due to the scale, certain time gaps appear to be zero, when they may in fact be several seconds or minutes). For example, datapoint 300 represents the first message in the chat, which has a delay of zero seconds as there was no prior message in the chat. Datapoint 302 represents the time gap (e.g., 3676 seconds) between message$_2$ (the second message in the electronic chat) and message$_1$ (the first message in the electronic chat), datapoint 304 represents the time gap (e.g., 53 seconds) between messages (the third message in the electronic chat) and message$_2$ (the second message in the electronic chat), datapoint 306** represents the time gap (e.g., 101287 seconds) between message$_4$ (the fourth message in the electronic chat) and messages (the third message in the electronic chat) and so on.

Figure 3B:
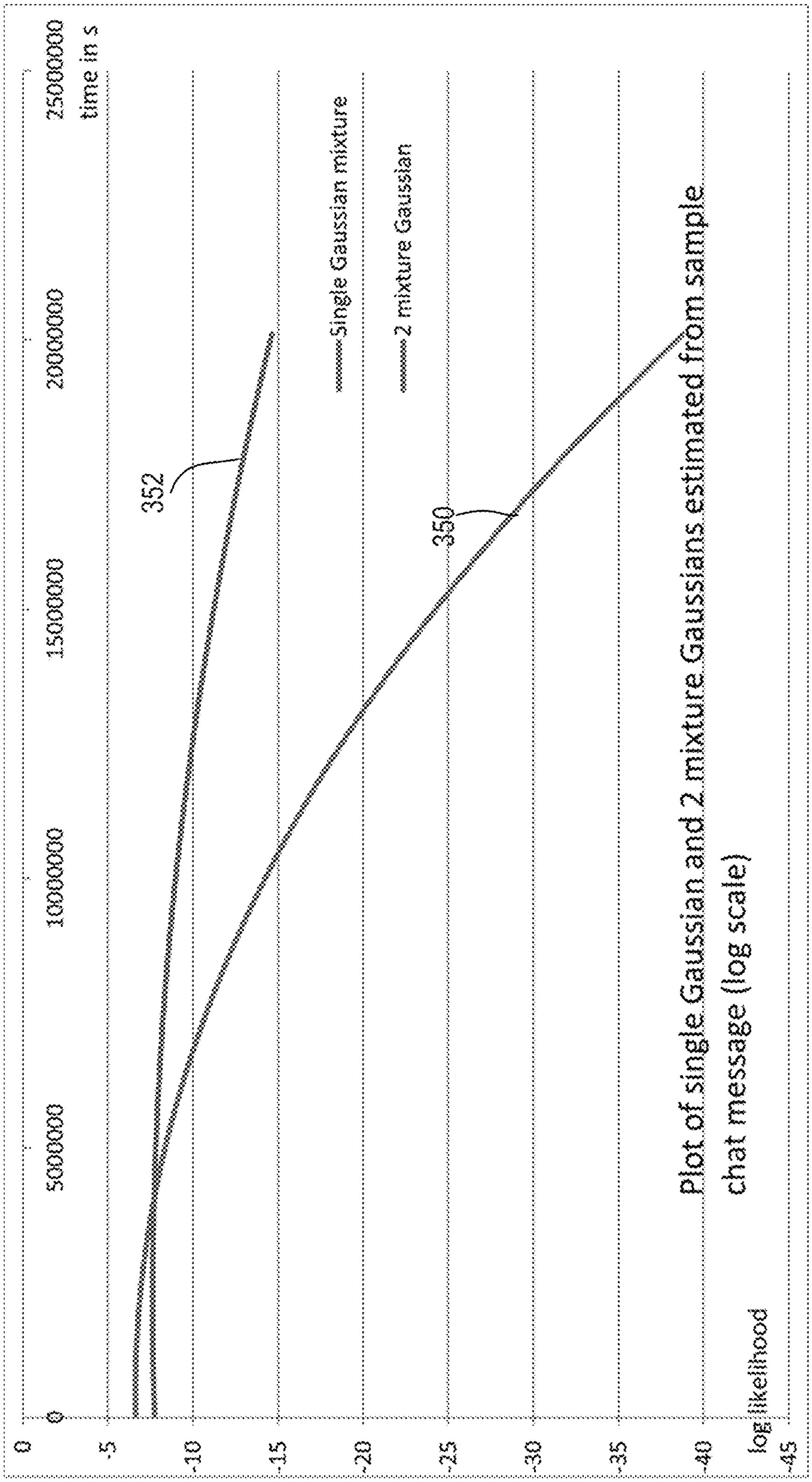
FIG. 3B is a chart illustrating a plot of a single Gaussian distribution and a mixture of two Gaussian distributions determined from the data of FIG. 3A.

According to some embodiments, an electronic chat splitter component may determine a single gaussian distribution and a Gaussian mixture model modelling a mixture of k Gaussian components. FIG. 3B, for example, is a chart illustrating a plot of a single Gaussian distribution (line 350) and a plot of a Gaussian mixture model modelling a mixture of two Gaussian distributions (line 352) determined based on the time differences of FIG. 3A. The x-axis represents time difference, and the y-axis represents the loglikelihood. Various criteria can be used to select which model (e.g., a single Gaussian distribution or a Gaussian mixture modelling a mixture of k Gaussian components best models the data).

If the chat is best modelled by the single Gaussian distribution, the chat may be stored and be considered to be a single conversation. If the chat is best modelled by a Gaussian mixture model, the electronic chat splitter component determines potential split points in the chat based on the Gaussian mixture model. According to one embodiment, the electronic chat splitter component determines the Gaussian distribution represented by the Gaussian mixture model that has the highest mean value and identifies split points based on the datapoints that have the highest probability for the Gaussian distribution with the highest mean value.

Figure 3C:
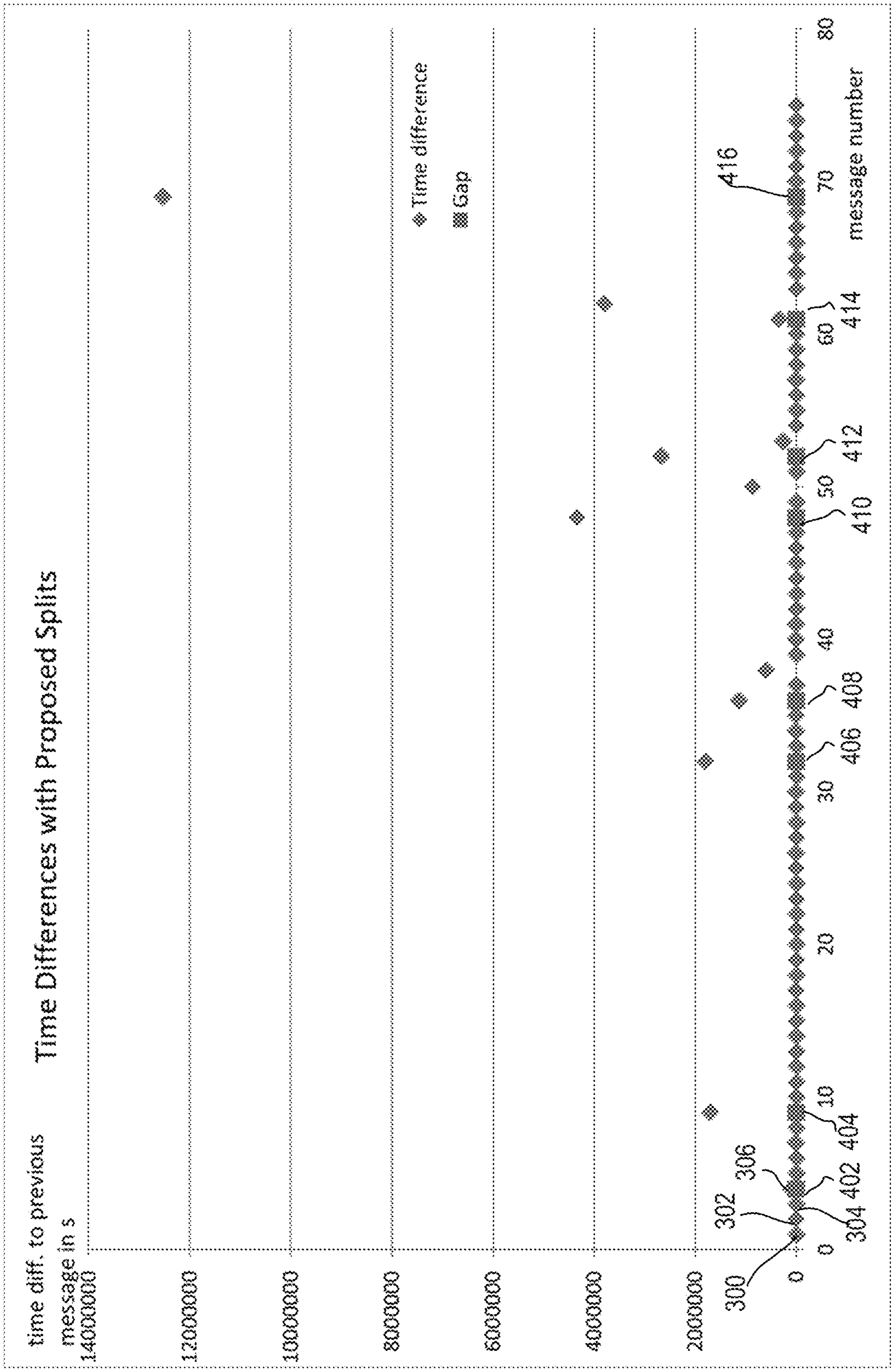
FIG. 3C is a chart illustrating potential split points based on the data of FIG. 3A.

FIG. 3C illustrates a set of potential split points, including split point 402, split point 404, split point 406, split point 408, split point 410, split point 412, split point 414, and split point 416. Split point 402 indicates for example, that the chat should potentially be split before the message corresponding to datapoint 306 such that message$_1$-message$_3$ are in the one conversation and message$_4$ is the first message in a new conversation. According to one embodiment, the split points are selected because the corresponding datapoint $x_i$ has the highest probability for the highest mean value Gaussian distribution of a Gaussian mixture model that models the data of FIG. 3A.

Additional message splitting rules may also be applied. For example, it may be desired in some embodiments that a conversation have at least a minimum number of messages. According to one embodiment, if a proposed split point would result in a conversation with less than a required number of messages, the proposed split point may be ignored when splitting the chat into conversations.

Figure 4:
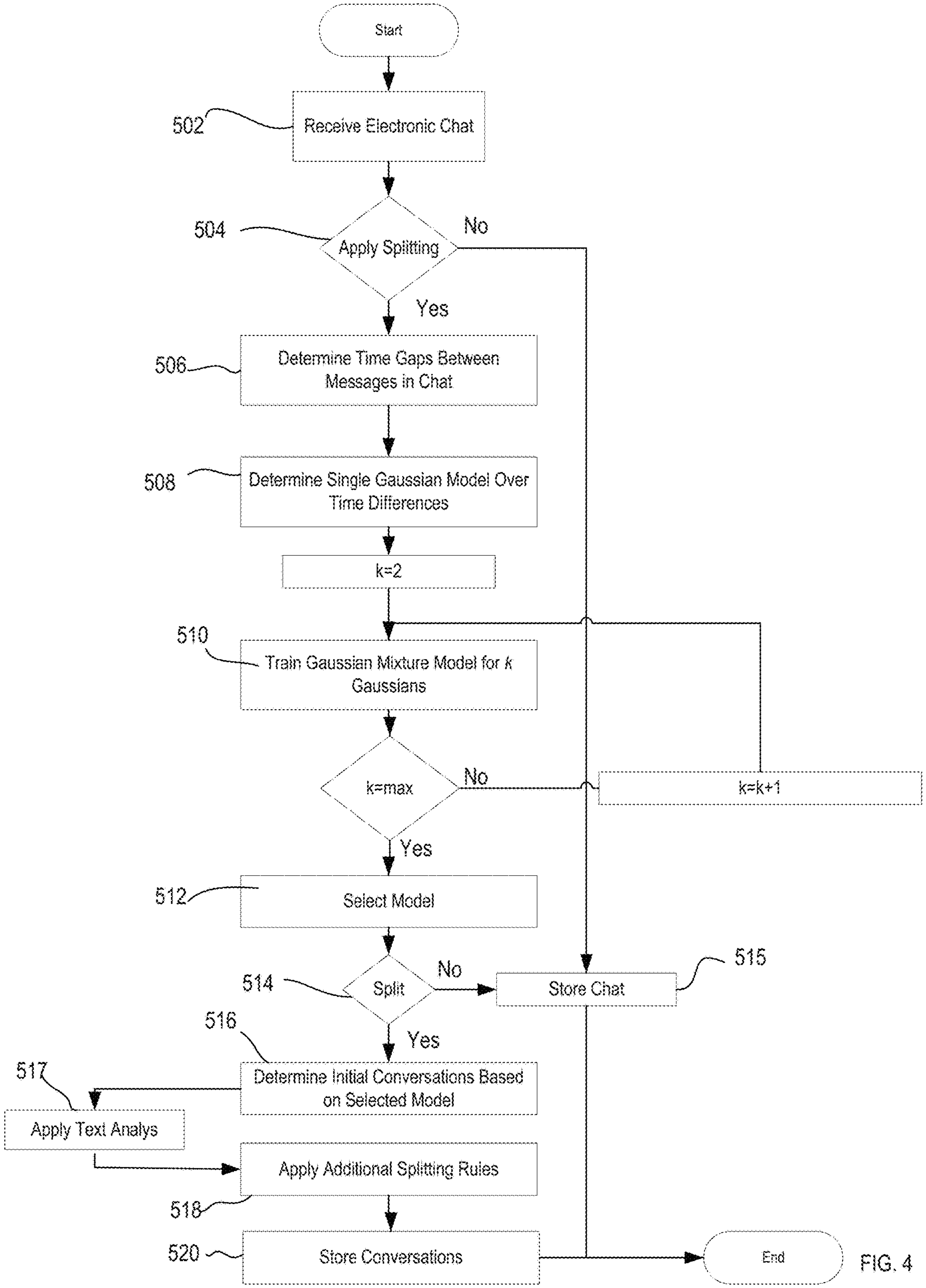
FIG. 4 is a flowchart illustrating one embodiment of a method for processing an electronic chat.

FIG. 4 is a flowchart illustrating one embodiment of a method for processing an electronic chat. The method of FIG. 4 may be implemented through execution of computer readable program code embodied on a non-transitory computer readable medium.

The electronic chat splitter component receives an electronic chat—by way of example, but not limitation, an XML file or XML stream—that includes any number of messages by any number of participants, over a potentially large period of time (step 502). In some embodiments, the electronic chat splitter component applies rules to determine whether to split the electronic chat into multiple conversations (step 504). For example, the electronic chat splitter component may be configured to only split electronic chats that have greater than a threshold number of messages, are larger than a particular size or meet other criteria.

As discussed above, the electronic chat splitting component according to some embodiments splits electronic chats based on the time gaps between the messages in the electronic chat. To this end, the time gaps between adjacent messages can be determined to produce a series of datapoints comprising the time gaps (step 506).

The electronic chat splitter component can then determine a statistical model of the time gaps. According to one embodiment, the electronic chat splitter component determines a Gaussian distribution of the time gaps—that is, it determines the standard deviation ($\sigma$) or variance ($\sigma^2$) and mean (p) of the time gaps from the chat (step 508).

The electronic chat splitter component, according to one embodiment, also learns one or more Gaussian mixture models from the time gap data determined from the chat (step 510). The Gaussian mixture model may model any number of Gaussian components—that is, Gaussian distributions—and the electronic chat splitter component may learn any number of Gaussian mixture models.

In the embodiment illustrated, the electronic chat splitter component learns Gaussian mixture models that model from two Gaussian distributions to a max number of Gaussian distributions. If the maximum number of Gaussian components is set to five, for example, the electronic chat splitter component learns a Gaussian mixture model modelling two Gaussian distributions (k=2), a Gaussian mixture model modelling three Gaussian distributions (k=3), a Gaussian mixture model modelling four Gaussian distributions (k=4), and a Gaussian mixture model modelling five Gaussian distributions (k=5), resulting in six models: the single Gaussian distribution determined at step 508 and the five Gaussian mixture models determined at step 510.

A Gaussian mixture model of k Gaussians may be represented by:

$$p(x|\mu, \sigma) = \sum_{i\in[0,k)} \pi_i N(x, \mu_i, \sigma_i)$$

where $\pi_i$ is a weighting factor for the $i^{th}$ Gaussian N represented by the model, x represents data, $\mu_i$ represents the mean of the $i^{th}$ Gaussian and $\sigma_i$ is the standard deviation for the $i^{th}$ Gaussian. For each Gaussian distribution in a Gaussian mixture model, the chat splitter component learns a standard deviation ($\sigma_i$) or variance ($\sigma_i^2$), mean ($\mu_i$) and weighting factor ($\pi_i$). For example, for a Gaussian mixture model that represents the mixture of two Gaussian distributions (k=2), the chat splitter component learns ($\sigma_0$, $\mu_0$, $\pi_0$) for the first Gaussian distribution and ($\sigma_1$, $\|_1$, $\pi_1$) for the second Gaussian distribution.

Expectation Maximization (EM) techniques can be used to learn the Gaussian distributions of the Gaussian mixture model. As will be appreciated, training a Gaussian mixture model using EM often begins with a "guess" of standard deviation ($\sigma$) or variance ($\sigma^2$), mean ($\mu$) for each distribution represented by the model. For example, for a Gaussian mixture model that represents the mixture of two Gaussian distributions, the chat splitter component begins with a guess for ($\sigma_0$, $\mu_0$, $\pi_0$) and a guess for ($\sigma_1$, $\mu_1$, $\pi_1$). The guesses may be hardcoded, determined from the data through various techniques known or developed in the art, provided by configuration, or otherwise determined. According to one embodiment, the electronic chat splitter component determines the mean and variance for the single Gaussian distribution and "guesses" the means and variances for the Gaussian components of a Gaussian mixture model by moving the mean and scaling the variance from the single Gaussian distribution.

In the expectation step, the current means, standard deviations, and weighting factors for the Gaussian distributions of the mixture model are used to determine the probabilities that each Gaussian of the Gaussian mixture model is responsible for a datapoint (referred to as responsibilities). A responsibility is calculated for each time gap datapoint for each Gaussian of the mixture model being learned. For example, when learning a mixture model that represents two Gaussian distributions using one hundred datapoints, the expectation step generates two hundred responsibilities, one for each datapoint for each Gaussian. In the maximization step, the responsibilities for the datapoints with respect to each Gaussian curve are used to improve the guess of each Gaussian distribution's mean, standard deviation and the weighting factor and thus learn better values for ($\sigma_0$, $\mu_0$, $\pi_0$) . . . ($\sigma_{k-1}$, $\mu_{k-1}$, $\pi_{k-1}$).

The values for means, standard deviations and the weighting factors learned in an iteration of the maximization step can then be used as the current values for the means, standard deviations, and weighting factors for the Gaussian distributions of the mixture model in a next iteration of the EM steps. The EM steps can be repeated until a stopping condition is reached, such as a certain number of iterations being performed, the mean, a convergence condition is reached, or another condition is met. At the end of learning a Gaussian mixture model, the electronic chat splitter component may thus include a Gaussian mixture model comprising a trained ($\sigma$, $\mu$, $\pi$) for each Gaussian distribution represented by the mixture model. Again, step 510 can be repeated to learn multiple Gaussian mixture models.

The chat splitter component applies model selection criteria to select a model of the chat (step 512). According to one embodiment, the models generated at step 508 and step 510 are compared using the Bayesian Information Criterion (BIC). In some embodiments, a weighting criterion in the BIC computation can be configured to control the sensitivity of splits to prevent or reduce awkward splits (e.g., splits in which only a single message or only some other small number of messages is split into a conversation). According to one embodiment, the weighting criterion adds a penalty to Gaussians with more mixtures thus reducing the likelihood of splits in general. This is a soft parameter as splits still may happen if the data suggests them. One mechanism of applying weighting criterion using a BIC criterion is described in *Robust Speaker Diarization for Meetings*, PhD Thesis, Xavier Anguera Miro, Speech Processing Group, Department of Signal Theory and Communications, Universitat Politecnica de Catalunya, Barcelona, 2006, which is hereby fully incorporated by reference herein (http://www.xavieranguera.com/phdthesis/).

According to one embodiment, the BIC expression can be stated as:

$$BIC(M_i) = \log \mathcal{L}(X_i, M_i) - \lambda \frac{1}{2} \#(M_i) \log(N_i)$$

where, $X_i$ is an observation sequence ($x_i$ is one particular vector value), $N_i$ is the total number of observations in the sequence, Mi is a model with a certain number of free parameters to estimate from the data, given by #(Mi), which accounts for the complexity of the model, log $\mathcal{L}(X_i,N_i)$ is the log-likelihood of the data given the considered model, $\lambda$ is a design parameter (weighting criterion) that may be optimized to change the effect of the penalty term.

The electronic chat splitter component determines whether to split the chat into multiple conversations based on the model selected (step 514). If the single Gaussian distribution determined at step 508 is selected at step 512, then the entire chat is stored as a single entity (e.g., single document) (step 515). If a Gaussian mixture model representing the mixture of k Gaussian distributions is selected, an initial determination of the potential conversations can be made (step 516). For example, potential split points may be determined.

According to one embodiment, the electronic chat splitter splits the chat into conversations based on the time delay data and the selected Gaussian mixture model. In some embodiments, the electronic chat splitter component applies text analysis at step 517 based on conversation splits applied in step 516. In other embodiments, the text analysis is not performed. Additional rules may be applied to further determine how the chat is split into conversations (step 518). As one example, rules may be applied to prevent a conversation from having less than a threshold number of messages or to prevent splitting the last message (or some number of messages) into a separate conversation. For example, if a potential split point would result in either a conversation immediately before the potential split point or a conversation immediately after the potential split point having less than a minimum number of messages, the electronic chat split can ignore the potential split point. If the potential split point would not violate the rules, the potential split point can be used as an actual split point.

Awkward splits (e.g., a single message or some other small number of messages split from the rest) may be avoided through a variety of mechanisms. For example, the minimum number of messages of any result conversation can be configured. According to one embodiment, a weighting factor in the BIC computation can be configured to control the sensitivity of splits.

The electronic chat splitter component splits the conversation at the determined actual split points and stores the conversations determined from the chat (step 520). According to one embodiment, the electronic chat splitter stores each conversation as a separate file or other data structures for further processing. Even more particularly, in some embodiments, each conversation is stored as a separately indexable data structure. A common identifier can be stored (e.g., in conversation metadata) to link conversations so that all conversations created from the same root chat can be located.

FIG. 4 is provided by way of example and not limitation. Various steps may be repeated, steps performed in different orders, steps omitted, and additional or alternative steps performed.

Figure 5:
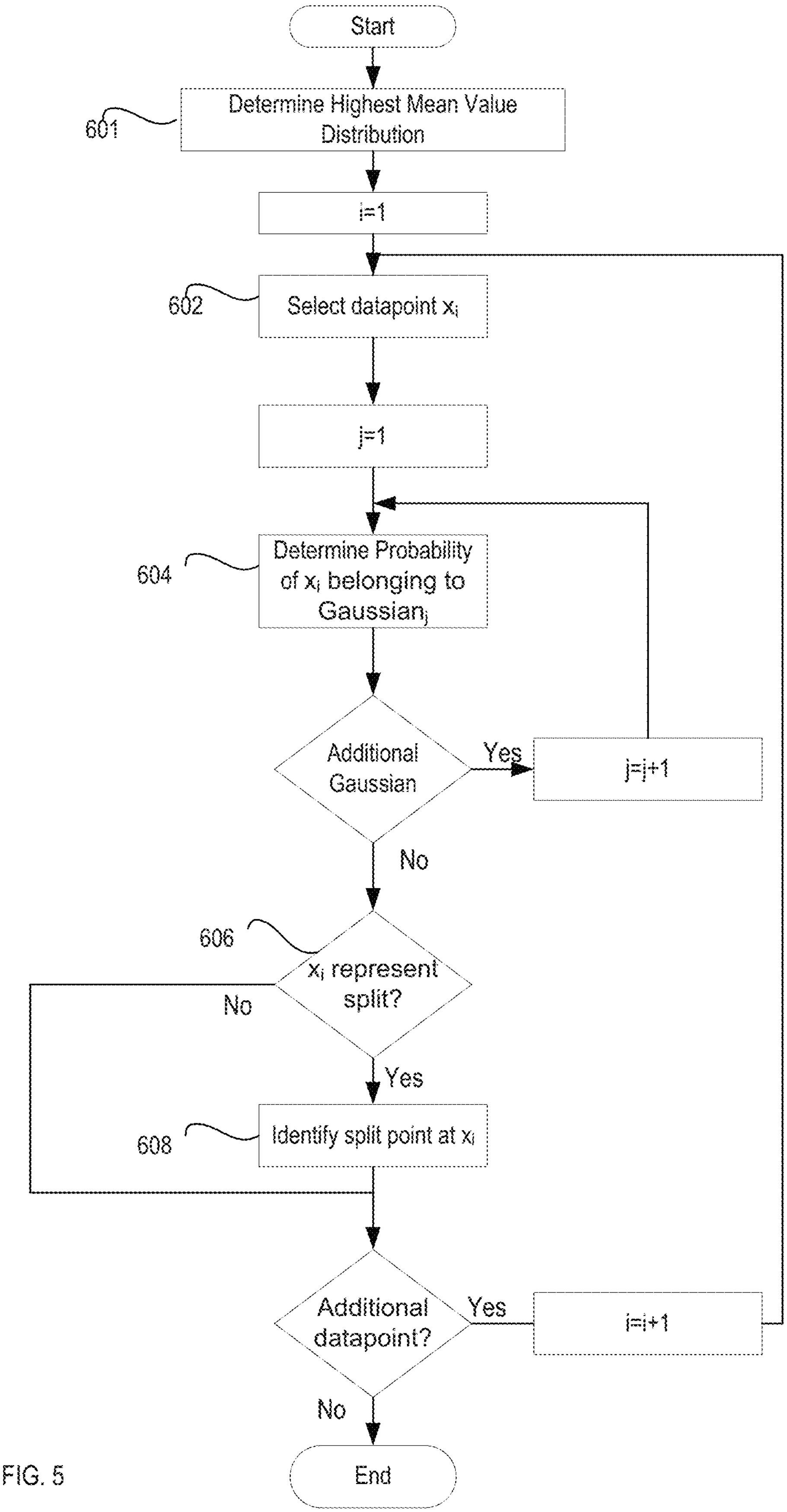
FIG. 5 is a flow chart illustrating one embodiment of adaptive splitting of an electronic chat into conversations.

FIG. 5 is a flow chart illustrating one embodiment of splitting a chat (e.g., at step 516). The method of FIG. 5 may be implemented through execution of computer readable program code embodied on a non-transitory computer readable medium.

As discussed below, adaptive splitting may be based on a highest mean value distribution from the mixture of Gaussian distributions represented by the Gaussian mixture model. Thus, at step 601, the electronic chat splitter determines the Gaussian distribution from the Gaussian mixture model that has the highest mean (p) value. The distribution from the Gaussian mixture model that has the highest mean value represents the largest time gaps with the chat document, which may be assumed to be breaks between conversations.

The electronic chat splitter component can iterate or otherwise process the time gaps determined for the set of messages in the electronic chat. In the illustrated embodiment, a datapoint $x_i$ representing a time gap between adjacent messages is selected (step 602).

According to one embodiment, the electronic chat splitter component determines the probability that the selected datapoint $x_i$ belongs to each Gaussian represented by the selected Gaussian mixture model (step 604). For example, if the Gaussian mixture model selected at step 512 represents the mixture of two Gaussian distributions, the electronic chat splitter component determines the probability that the selected datapoint $x_i$ belongs to each of the two Gaussian distributions represented by the Gaussian mixture model, thus producing a set of probabilities for the datapoint $x_i$.

The electronic chat splitter component determines if a time gap represents a change in conversation (step 606). According to one embodiment, if $x_i$ has the highest probability for the Gaussian distribution with the highest mean value, the electronic chat splitter identifies $x_i$ as representing a potential split point (step 608). If the potential split point is used as an actual split point (e.g., based on rules applied at step 518), $message_i$ can be determined to be the first message of a new conversation. If the highest probability for $x_i$ does not correspond to the Gaussian distribution with the largest mean value, $x_i$ is not identified as representing a potential split point.

According to one embodiment, the steps may be repeated for each of the time gap datapoints corresponding to the chat. In some embodiments, the electronic chat splitting component will stop adaptive splitting when less than some threshold number of datapoints remains to ensure that a conversation with only a single message (or some other small number of messages) is not created.

FIG. 5 is provided by way of example and not limitation. Various steps may be repeated, steps performed in different orders, steps omitted, and additional or alternative steps performed.

As discussed, in some embodiments, the electronic chat splitter applies text analysis at step 517 on conversation splits applied in step 516. When combined with the time gap Gaussian analysis discussed herein above, the text analysis can provide additional insight for splitting the chat into conversations. As shown in FIG. 6, an electronic chat 630 is portrayed comprising a set of chat messages characterized by a time (e.g., calendar date 632 and time 637), and a chat user 639 for a chat message 635 in the electronic chat 630.

In the hypothetical example of FIG. 6, a time gap Gaussian analysis can be applied to determine an initial set of chat 630 message splits, resulting in two conversations 640 and 650.

The time gap Gaussian-based split (e.g., step 516 of FIG. 5), in this example, results in two potential conversations, which occur on different calendar dates, namely, Jun. 15, 2021, and Jun. 17, 2021. With the addition of a text analysis on the conversations, the chat messages may be further differentiated by chat subject matter. In this non-limiting embodiment, three subject matters are computed, namely, “legal language”, “trademark”, and “patent”. Such chat subject matter identification in the text analysis step 517 may be performed by a text-mining and classification engine.

At step 517 of FIG. 5, the electronic chat splitter component further processes the messages corresponding to the two potential conversations 640, 650 to determine whether to sub-split the conversations based on chat subject matter. Here, as a result of the text analysis, the electronic chat splitter component further splits conversation 650 into two sub-conversations 651 and 660, wherein conversation 651’s chat subject matter equals “trademark” and conversation 660’s chat subject matter equals “patents”.

Figure 7:
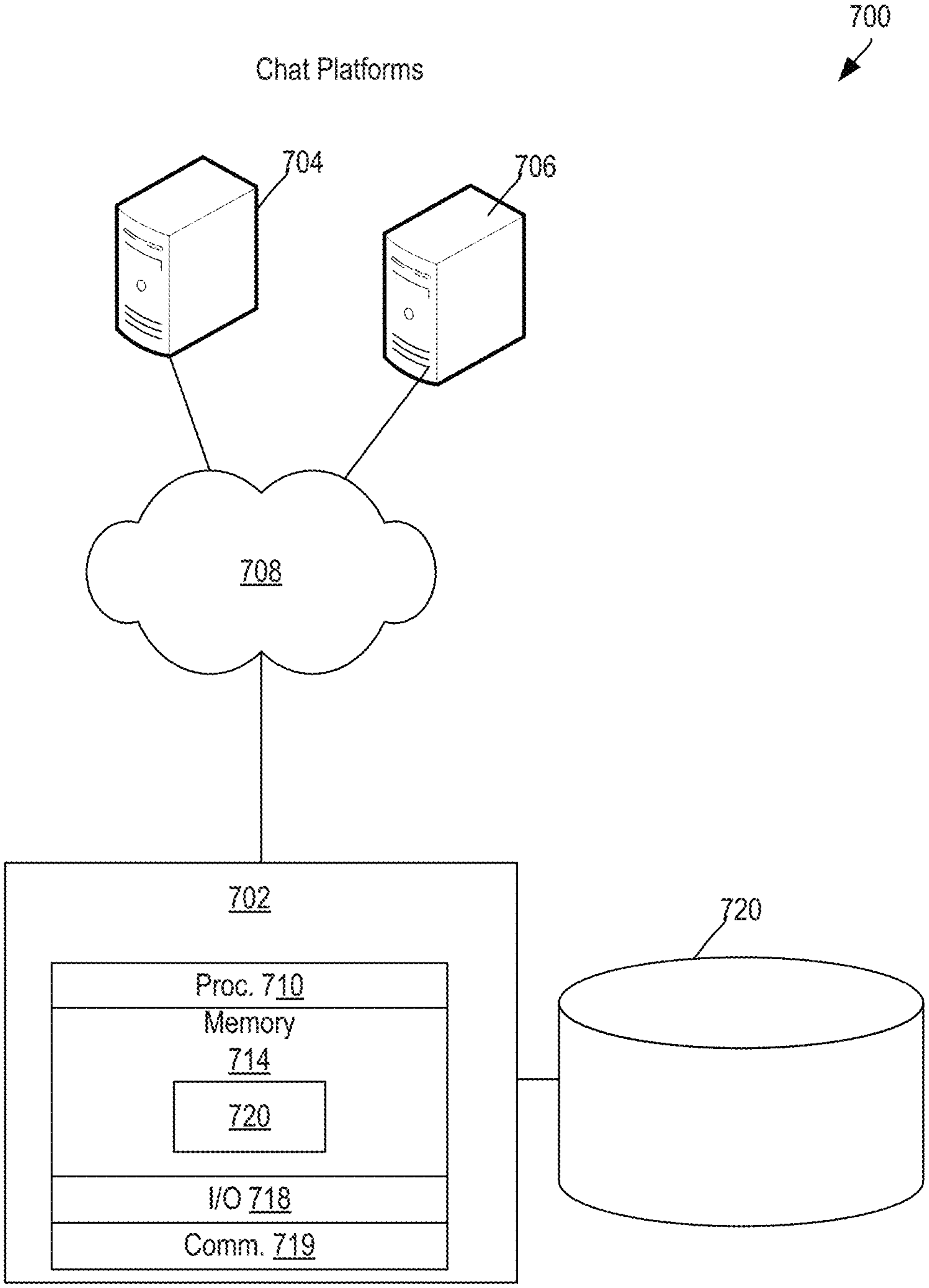
FIG. 7 is a diagrammatic representation of one embodiment of a networked computing environment.

Thus, as will be readily understood by one of ordinary skill in the art, the combination of time gap Gaussian analysis and text analysis on a chat can result in a more precise, accurate, and useful split into conversations 640, 651, and 660. It should be understood that the order of chat splitting may be reversed wherein text analysis step 517 is first performed and then enhanced by the Gaussian-based analysis. Furthermore, some embodiments may perform only the text analysis in step 517. FIG. 7 is a diagrammatic representation of one embodiment of a computing environment 700. In the illustrated embodiment, computing environment 700 includes a computer system 702 that connects to electronic chat system 704 and electronic chat system 706 via a network 708. For the purpose of illustration, a single system is shown for computer system 702, electronic chat system 704 and electronic chat system 706. However, each of computer system 702, electronic chat system 704 and electronic chat system 706 may comprise a plurality of computers (not shown) interconnected to each other over network 708.

Computer system 702 comprises a computer processor 710 and associated memory 714. Computer processor 710 may be an integrated circuit for processing instructions. For example, computer processor 710 may comprise one or more cores or micro-cores of a processor. Memory 714 may include volatile memory, non-volatile memory, semi-volatile memory or a combination thereof. Memory 714, for example, may include RAM, ROM, flash memory, a hard disk drive, a solid-state drive, an optical storage medium (e.g., CD-ROM), or other computer-readable memory or combination thereof. Memory 714 may implement a storage hierarchy that includes cache memory, primary memory or secondary memory. In some embodiments, memory 714 may include storage space on a data storage array. Computer system 702 may also include input/output (“I/O”) devices 718, such as a keyboard, monitor, printer, electronic pointing device (e.g., mouse, trackball, stylus, etc.), or the like. Computer system 702 may also include a communication interface 719, such as a network interface card, to interface with network 708, which may be a local LAN, a WAN such as the Internet, mobile network, or other type of network or combination thereof. Network 708 may represent a combination of wired and wireless networks that may be utilized for various types of network communications.

Memory 714 may store instructions executable by computer processor 710. For example, memory 714 may include code executable to provide an electronic chat splitter component. In some embodiments, memory 714 provides instructions for an e-discovery system. Thus, computer system 702 may be one embodiment of an e-discovery computer system 100. Data store 720, which may be part of or separate from memory 714, may comprise one or more database systems, file store systems, or other systems to store various data used by computer system 702.

Each of the computers in FIG. 7 may have more than one CPU, ROM, RAM, HD, 1/O, or other hardware components. Portions of the methods described herein may be implemented in suitable software code that may reside within memory 714 or other computer-readable memory.

Those skilled in the relevant art will appreciate that the embodiments can be implemented or practiced in a variety of computer system configurations including, without limitation, multi-processor systems, network devices, mini-computers, mainframe computers, data processors, and the like. Embodiments can be employed in distributed computing environments, where tasks or modules are performed by remote processing devices, which are linked through a communications network such as a LAN, WAN, and/or the Internet. In a distributed computing environment, program modules or subroutines may be located in both local and remote memory storage devices. These program modules or subroutines may, for example, be stored or distributed on computer-readable media, stored as firmware in chips, as well as distributed electronically over the Internet or over other networks (including wireless networks). Example chips may include Electrically Erasable Programmable Read-Only Memory (EEPROM) chips.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention. Steps, operations, methods, routines or portions thereof described herein be implemented using a variety of hardware, such as CPUs, application specific integrated circuits, programmable logic devices, field programmable gate arrays, optical, chemical, biological, quantum or nanoengineered systems, or other mechanisms.

Software instructions in the form of computer-readable program code may be stored, in whole or in part, temporarily or permanently, on a non-transitory computer-readable medium. The computer-readable program code can be operated on by a processor to perform steps, operations, methods, routines or portions thereof described herein. A “computer-readable medium” is a medium capable of storing data in a format readable by a computer and can include any type of data storage medium that can be read by a processor. Examples of non-transitory computer-readable media can include, but are not limited to, volatile and non-volatile computer memories, such as RAM, ROM, hard drives, solid state drives, data cartridges, magnetic tapes, floppy diskettes, flash memory drives, optical data storage devices, compact-disc read-only memories. In some embodiments, computer-readable instructions or data may reside in a data array, such as a direct attach array or other array. The computer-readable instructions may be executable by a processor to implement embodiments of the technology or portions thereof.

A “processor” includes any hardware system, mechanism or component that processes data, signals or other information. A processor can include a system with a general-purpose central processing unit, multiple processing units, dedicated circuitry for achieving functionality, or other systems. Processing need not be limited to a geographic location or have temporal limitations. For example, a processor can perform its functions in “real-time,” “offline,” in a “batch mode,” etc. Portions of processing can be performed at different times and at different locations, by different (or the same) processing systems.

Different programming techniques can be employed such as procedural or object oriented. Any suitable programming language can be used to implement the routines, methods or programs of embodiments of the invention described herein, including R, Python, C, C++, Java, JavaScript, HTML, or any other programming or scripting code, etc. Communications between computers implementing embodiments can be accomplished using any electronic, optical, radio frequency signals, or other suitable methods and tools of communication in compliance with known network protocols.

Any particular routine can be executed on a single computer processing device or multiple computer processing devices, a single computer processor or multiple computer processors. Data may be stored in a single storage medium or distributed through multiple storage mediums. In some embodiments, data may be stored in multiple databases, multiple filesystems or a combination thereof.

Although the steps, operations, or computations may be presented in a specific order, this order may be changed in different embodiments. In some embodiments, some steps may be omitted. Further, in some embodiments, additional or alternative steps may be performed. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

It will be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

As used herein, the terms “comprises,” “comprising,” “includes,” “including,” “has,” “having,” or any other variation thereof, are intended to cover a non-exclusive inclusion. For example, a process, product, article, or apparatus that comprises a list of elements is not necessarily limited to only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present), and B is false (or not present), A is false (or not present), and B is true (or present), and both A and B are true (or present). As used herein, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the meaning of "in" includes "in" and "on" unless the context clearly dictates otherwise.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations includes, but is not limited to: "for example," "for instance," "e.g.," "in one embodiment."

Thus, while the invention has been described with respect to specific embodiments thereof, these embodiments are merely illustrative, and not restrictive of the invention. Rather, the description (including the Abstract and Summary) is intended to describe illustrative embodiments, features and functions in order to provide a person of ordinary skill in the art context to understand the invention without limiting the invention to any particularly described embodiment, feature or function, including any such embodiment feature or function described. While specific embodiments of, and examples for, the invention are described herein for illustrative purposes only, various equivalent modifications are possible within the spirit and scope of the invention, as those skilled in the relevant art will recognize and appreciate.

As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component.

What is claimed is:

1. A computer program product comprising a non-transitory, computer-readable medium embodying thereon a set of computer instructions, the set of computer instructions comprising instructions for:

accessing an electronic chat, the electronic chat embodying a set of electronic chat messages;

generating a set of models that model time gaps between adjacent messages from the set of electronic chat messages, wherein the set of models includes at least a first model corresponding to a single conversation and one or more second models that each correspond to two or more conversations, and wherein generating the set of models is performed without regard to the content of any of the electronic chat messages; and in response to selecting one of the one or more second models as a best model based on one or more criteria, adaptively splitting the set of electronic chat messages into a set of conversations without regard to the content of any of the electronic chat messages, each conversation in the set of conversations comprising a subset of electronic chat messages from the set of electronic chat messages, wherein adaptively splitting the set of electronic chat messages into a set of conversations further comprises:

identifying a plurality of split points based on the time gaps between the adjacent messages from the set of electronic chat messages, wherein the identifying is performed based on providing information relating to the time gaps to a machine learning model trained to determine which of the time gaps correspond to a given split point between respective conversations based on distributions of time gaps associated with a plurality of electronic messages within the respective conversations; and storing each conversation from the set of conversations as a separate document.

2. The computer program product of claim 1, wherein each electronic chat message embodied in the electronic chat has associated metadata and wherein adaptively splitting the set of electronic chat messages into the set of conversations comprises clustering the set of electronic chat messages into clusters based on the associated metadata of the electronic chat messages from the set of electronic chat messages.

3. The computer program product of claim 1, wherein each electronic chat message embodied in the electronic chat has a timestamp and wherein adaptively splitting the set of electronic chat messages into the set of conversations comprises clustering the set of electronic chat messages into clusters based on the timestamps of the electronic chat messages from the set of electronic chat messages.

4. The computer program product of claim 1, wherein the first model comprises a single Gaussian distribution of the set of time gaps and each of the one or more second models comprises a Gaussian mixture model.

5. The computer program product of claim 4, wherein selecting the best model from the set of models comprises determining, for each model in the set of models, a Bayesian information criterion and selecting the best model from the set of models based on the Bayesian information criteria for the set of models.

6. The computer program product of claim 4, the computer program product further comprising adaptively splitting of the set of electronic chat messages into the set of conversations based on the Gaussian mixture model comprising:

selecting a time gap from the set of time gaps:

determining a probability of the selected time gap for each Gaussian distribution in the mixture of Gaussian distributions to produce a set of probabilities for the selected time gap; and based on a determination that a highest probability from the set of probabilities for the selected time gap is for the highest mean value distribution, splitting the electronic chat into new conversation at the selected time gap.

7. The computer program product of claim 6, wherein the set of computer instructions comprises instructions for not splitting the electronic chat at the selected time gap based on a determination that the highest probability from the set of probabilities for the selected time gap is not for the highest mean value distribution.

8. A computer-implemented method comprising:

receiving, by a computer processor, an electronic chat, the electronic chat embodying a set of electronic chat messages;

generating a set of models that model time gaps between adjacent messages from the set of electronic chat messages, wherein the set of models includes at least a first model corresponding to a single conversation and one or more second models that each correspond to two or more conversations, and wherein generating the set of models is performed without regard to the content of any of the electronic chat messages; and in response to selecting one of the one or more second models as a best model based on one or more criteria, adaptively splitting, by the computer processor, the set of electronic chat messages into a set of conversations without regard to the content of any of the electronic chat messages, each conversation in the set of conversations comprising a subset of electronic chat messages from the set of electronic chat messages, wherein adaptively splitting the set of electronic chat messages into a set of conversations further comprises:

identifying a plurality of split points based on the time gaps between the adjacent messages from the set of electronic chat messages, wherein the identifying is performed based on providing information relating to the time gaps to a machine learning model trained to determine which of the time gaps correspond to a given split point between respective conversations based on distributions of time gaps associated with a plurality of electronic messages within the respective conversations; and storing, by the computer processor, each conversation from the set of conversations as a separate document.

9. The computer-implemented method of claim 8, wherein each electronic chat message embodied in the electronic chat has associated metadata and wherein adaptively splitting the set of electronic chat messages into the set of conversations comprises clustering the set of electronic chat messages into clusters based on the associated metadata of the electronic chat messages from the set of electronic chat messages.

10. The computer-implemented method of claim 8, wherein each electronic chat message embodied in the electronic chat has a timestamp and wherein adaptively splitting the set of electronic chat messages into the set of conversations comprises clustering the set of electronic chat messages into clusters based on the timestamps of the electronic chat messages from the set of electronic chat messages.

11. The computer-implemented method of claim 8, wherein the first model comprises a single Gaussian distribution of the set of time gaps and each of the one or more second models comprises a Gaussian mixture model.

12. The computer-implemented method of claim 8, wherein selecting the best model from the set of models comprises determining a Bayesian information criterion for each model in the set of models and selecting the best model from the set of models based on the Bayesian information criteria for the set of models.

13. The computer-implemented method of claim 11, further comprising splitting of the set of electronic chat messages into the set of conversations based on a Gaussian mixture model comprising:

selecting a time gap from the set of time gaps:

determining a probability of the selected time gap for each Gaussian distribution in the mixture of Gaussian distributions to produce a set of probabilities for the selected time gap; and based on a determination that a highest probability from the set of probabilities for the selected time gap is for the highest mean value distribution, splitting the electronic chat into new conversation at the selected time gap.

14. An e-discovery system comprising:

a computer processor;

a non-transitory, computer-readable medium embodying thereon a set of computer instructions executable by the computer processor, the set of computer instructions comprising instructions for:

sending a chat query to a remote electronic chat service;

receiving an electronic chat responsive to the chat query, the electronic chat embodying a set of electronic chat messages;

generating a set of models that model time gaps between adjacent messages from the set of electronic chat messages, wherein the set of models includes at least a first model corresponding to a single conversation and one or more second models that each correspond to two or more conversations, and wherein generating the set of models is performed without regard to the content of any of the electronic chat messages; and in response to selecting one of the one or more second models as a best model based on one or more criteria, adaptively splitting the set of electronic chat messages into a set of conversations without regard to the content of any of the electronic chat messages, each conversation in the set of conversations comprising a subset of electronic chat messages from the set of electronic chat messages, wherein adaptively splitting the set of electronic chat messages into a set of conversations further comprises:

identifying a plurality of split points based on the time gaps between the adjacent messages from the set of electronic chat messages, wherein the identifying is performed based on providing information relating to the time gaps to a machine learning model trained to determine which of the time gaps correspond to a given split point between respective conversations based on time distributions of time gaps associated with a plurality of electronic messages within the respective conversations; and storing each conversation from the set of conversations as a separate document.

15. The e-discovery system of claim 14, wherein each electronic chat message embodied in the electronic chat has associated metadata and wherein adaptively splitting the set of electronic chat messages into the set of conversations comprises clustering the set of electronic chat messages into clusters based on the associated metadata of the electronic chat messages from the set of electronic chat messages.

16. The e-discovery system of claim 14, wherein each electronic chat message embodied in the electronic chat has a timestamp and wherein adaptively splitting the set of electronic chat messages into the set of conversations comprises clustering the set of electronic chat messages into clusters based on the timestamps of the electronic chat messages from the set of electronic chat messages.

17. The e-discovery system of claim 14, wherein the first model comprises a single Gaussian distribution of the set of time gaps and each of the one or more second models comprises a Gaussian mixture model.

18. The e-discovery system of claim 17, wherein selecting the best model from the set of models comprises determining, for each model in the set of models, a Bayesian information criterion and selecting the best model from the set of models based on the Bayesian information criteria for the set of models.

19. The e-discovery system of claim 17, further comprising adaptively splitting of the set of electronic chat messages into the set of conversations based on a Gaussian mixture model comprising:

selecting a time gap from the set of time gaps:

determining a probability of the selected time gap for each Gaussian distribution in the mixture of Gaussian distributions to produce a set of probabilities for the selected time gap; and based on a determination that a highest probability from the set of probabilities for the selected time gap is for the highest mean value distribution, splitting the electronic chat into new conversation at the selected time gap.

20. The e-discovery system of claim 19, wherein the set of computer instructions comprises instructions for not splitting the electronic chat at the selected time gap based on a determination that the highest probability from the set of probabilities for the selected time gap is not for the highest mean value distribution.

* * * * *